United States Patent
Pikovsky et al.

(10) Patent No.: US 11,686,249 B2
(45) Date of Patent: Jun. 27, 2023

(54) TURBINE ENGINE COMPRISING A HEAT EXCHANGER IN THE SECONDARY PATH

(71) Applicant: SAFRAN AIRCRAFT ENGINES, Paris (FR)

(72) Inventors: Catherine Pikovsky, Moissy-Cramayel (FR); Christophe Marcel Lucien Perdrigeon, Moissy-Cramayel (FR); Cédric Zaccardi, Moissy-Cramayel (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 0 days.

(21) Appl. No.: 16/970,815

(22) PCT Filed: Feb. 18, 2019

(86) PCT No.: PCT/FR2019/050358
§ 371 (c)(1),
(2) Date: Aug. 18, 2020

(87) PCT Pub. No.: WO2019/162601
PCT Pub. Date: Aug. 29, 2019

(65) Prior Publication Data
US 2021/0115854 A1 Apr. 22, 2021

(30) Foreign Application Priority Data

Feb. 23, 2018 (FR) ...................................... 1851624

(51) Int. Cl.
*F02C 7/143* (2006.01)
*F01D 9/06* (2006.01)
(Continued)

(52) U.S. Cl.
CPC .............. *F02C 7/143* (2013.01); *F01D 9/065* (2013.01); *F02C 6/08* (2013.01); *F02C 7/14* (2013.01);
(Continued)

(58) Field of Classification Search
CPC .. F02C 7/185; F02C 6/08; F02C 7/047; F02C 7/141–143; F05D 2260/213; F01D 5/18;
(Continued)

(56) References Cited

U.S. PATENT DOCUMENTS 2,812,897 A * 11/1957 McTavish ........... F04D 27/0215
417/408
4,542,623 A * 9/1985 Hovan .................. F01D 25/125
415/176
(Continued)

FOREIGN PATENT DOCUMENTS

| GB | 1 244 340 | 8/1971 |
|---|---|---|
| WO | WO 02/38938 A1 | 5/2002 |
| WO | WO 2014/130103 A2 | 8/2014 |

OTHER PUBLICATIONS

U.S. Appl. No. 16/483,526, filed Aug. 5, 2019, US 2020/0032664, Beaujard et al.
(Continued)

*Primary Examiner* — Stephanie Sebasco Cheng
(74) *Attorney, Agent, or Firm* — Oblon, McClelland, Maier & Neustadt, L.L.P.

(57) ABSTRACT

An aircraft turbine engine having a primary air flow path with low-pressure and high-pressure compressors, a secondary air flow path which is located around the primary path and runs coaxially thereto, the turbine engine including vanes distributed about a main axis of the turbine engine. A pressurized air circuit draws air between the low-pressure compressor and the high-pressure compressor or in the (Continued)

high-pressure compressor and supplies at least one component located close to a main axis of the turbine engine. The pressurized air circuit includes a heat exchanger between the stream of pressurized air and the stream of air flowing in the secondary path, the heat exchanger being arranged in at least one of the straightening vanes, where a heat exchanger pipe is arranged, the pipe having a pressurized-air inlet and a pressurized-air outlet that are located at the same radial end of the vane.

11 Claims, 1 Drawing Sheet

(51) Int. Cl.
*F02C 7/18* (2006.01)
*F02K 3/115* (2006.01)
*F02C 6/08* (2006.01)
*F02C 7/14* (2006.01)
*F02C 7/047* (2006.01)

(52) U.S. Cl.
CPC .............. *F02C 7/185* (2013.01); *F02K 3/115* (2013.01); *F02C 7/047* (2013.01); *F05D 2220/323* (2013.01); *F05D 2260/213* (2013.01); *F05D 2260/98* (2013.01)

(58) Field of Classification Search
CPC .......... F01D 5/081; F01D 5/082; F01D 5/084; F01D 5/085; F01D 5/087; F01D 9/065; F01D 25/02; F01D 5/185; F01D 5/187–189; F01D 25/10; B64D 2033/0233; F02K 3/00–077; F02K 3/105–115; F02K 1/64–72
See application file for complete search history.

(56) References Cited

U.S. PATENT DOCUMENTS

| | | | |
|---|---|---|---|
| 4,645,415 A | | 2/1987 | Hovan et al. |
| 4,844,689 A * | | 7/1989 | Seed ................. F01D 9/041 |
| | | | 415/169.1 |
| 4,914,904 A * | | 4/1990 | Parnes ................. F01D 9/065 |
| | | | 60/39.08 |
| 9,945,247 B2 * | | 4/2018 | Appukuttan ............ F02K 3/115 |
| 10,316,681 B2 * | | 6/2019 | Narasimharao ......... F01D 5/085 |
| 10,337,406 B2 * | | 7/2019 | Suciu .................... F02C 3/04 |
| 10,563,582 B2 * | | 2/2020 | Duesler ............... F28D 1/05341 |
| 10,830,056 B2 * | | 11/2020 | Erno ................. F01D 9/065 |
| 2009/0097963 A1 * | | 4/2009 | Evans ................. F01D 9/065 |
| | | | 415/209.3 |
| 2015/0285186 A1 | | 10/2015 | Roberge |
| 2016/0369697 A1 * | | 12/2016 | Schwarz ............... F01D 25/12 |
| 2018/0238270 A1 | | 8/2018 | Roberge |
| 2019/0003392 A1 * | | 1/2019 | Roberge ............... F02C 7/36 |
| 2019/0218971 A1 * | | 7/2019 | Niergarth ............. F02C 7/185 |

OTHER PUBLICATIONS

U.S. Appl. No. 16/665,037, filed Oct. 28, 2019, US 2020/0131934, Pikovsky et al.
U.S. Appl. No. 16/809,637, filed Mar. 5, 2020, Zaccardi et al.
U.S. Appl. No. 16/462,264, filed May 20, 2019, US 2019/0338661, Zaccardi et al.
U.S. Appl. No. 16/270,771, filed Feb. 8, 2019, US 2019/0249558, Zaccardi et al.
U.S. Appl. No. 16/126,028, filed Sep. 10, 2018, US 2019/0078452, Zaccardi et al.
U.S. Appl. No. 15/653,976, filed Jul. 19, 2017, US 2018/0023406, Zaccardi et al.
International Search Report dated May 22, 2019 in PCT/FR2019/050358 filed on Feb. 18, 2019, 2 pages.
Preliminary French Search Report dated Oct. 11, 2018 in French Application No. 18 51624 filed on Feb. 23, 2018.

* cited by examiner

TURBINE ENGINE COMPRISING A HEAT EXCHANGER IN THE SECONDARY PATH

TECHNICAL FIELD

The invention relates to a turbine engine, such as an aircraft turbine engine including means for cooling a component located in the vicinity of a main axis of the turbine engine.

The invention relates more specifically to a turbine engine including means for cooling a low-pressure rotary shaft and/or lubrication oil pressurization chambers.

PRIOR ART

In current turbine engines, there are numerous internal motor air circuits. These circuits fulfill different functions.

Among these circuits, an air circuit fulfills both the function of pressurizing lubrication oil enclosures to prevent oil from coming out of these enclosures and the function of cooling the low-pressure shaft.

The air of this circuit is extracted at the level of the primary path, downstream from the low-pressure compressor, preferably between the low-pressure compressor and the high-pressure compressor.

This air is subsequently discharged by the oil separators, for the air passing via the enclosures and downstream from the low-pressure turbine for the remainder.

This circuit will be subject to head losses due to the changes in radii, holes, seals, etc. It is therefore necessary for the pressure ratio (extracted pressure/outflowing pressure) to be relatively large so that the air circulates correctly and with the desired flow rate.

Among the constraints on this air circuit, it is necessary for the air temperature to be relatively cold to cool the low-pressure shaft and not overheat the oil in the enclosures. The air pressure must be sufficient for the pressure ratio mentioned above to be relatively substantial and make it possible to circulate the specified flow rate.

Also, in some turbine engines, the thermodynamic cycle is such that the pressure ratio is too low for the circuit to fulfill these functions. It is therefore necessary to find a workaround solution.

Document EP-0.743.435 describes a turbine engine including a heat exchanger integrated in a straightener vane located in the secondary path. According to this document, the vane includes a cavity opening at each radial end of the vane for the entry or the exit of the air stream to be cooled.

Such a heat exchanger is thus suitable for an air circuit supplying a component located for example in the outer ferrule of the turbine engine, but it is not suitable for ventilating components located in the vicinity of the main axis of the turbine engine.

The aim of the invention is that of providing a turbine engine including means for effectively cooling the pressurized air stream extracted downstream from the low-pressure compressor, while producing low head losses.

DESCRIPTION OF THE INVENTION

The invention relates to an aircraft turbine engine including a primary air flow path wherein a low-pressure compressor and a high-pressure compressor are arranged, a secondary air flow path which is located around the primary path and coaxially with the primary path, including a straightener of the air stream flowing in the secondary path, including a plurality of vanes distributed around a main axis A of the turbine engine, a pressurized air circuit extracting air between the low-pressure compressor and the high-pressure compressor or in the high-pressure compressor to produce a pressurized air stream supplying at least one component of the turbine engine, said at least one component being located radially in the turbine engine in the vicinity of a main axis A of the turbine engine with respect to the primary path, wherein the pressurized air circuit includes a heat exchanger between the pressurized air stream and the air stream flowing in the secondary path, which is arranged in at least one vane of the straightener, characterized in that the heat exchanger includes a duct arranged in said at least one vane, which includes a pressurized air inlet and a pressurized air outlet which are located at the same radial end of said vane.

The use of a duct disposed in at least one straightener vane makes it possible not to produce any head loss in the secondary path.

Preferably, the pressurized air inlet and the pressurized air outlet of the duct are located at the level of an inner radial end of said vane.

Preferably, the internal volume of said vane is isolated from the air stream flowing in the secondary path.

Preferably, the turbine engine includes a lubrication circuit wherein a lubrication fluid circulates, including a section arranged in said vane.

Preferably, said section includes a lubrication fluid inlet and a lubrication fluid outlet which are located at the level of the same radial end of said vane as the pressurized air inlet and the pressurized air outlet of the duct.

Preferably, the turbine engine includes an inter-path compartment located between the primary path and the secondary path, and the pressurized air circuit includes, in the direction of air flow therein:
at least one air extraction point which is borne by a radially inner wall of the inter-path compartment;
an upstream section extending through the inter-path compartment to the secondary path;
said duct disposed in said vane;
a downstream section extending through the inter-path compartment from the secondary path to the primary path and extending through a profiled arm traversing the primary path;
means for distributing the pressurized air to said at least one component of the turbine engine.

Preferably, said at least one component of the turbine engine is a low-pressure shaft of the turbine engine.

Preferably, said at least component is a lubrication oil pressurization enclosure.

Preferably, said at least one component is a reduction gear which is arranged between the low-pressure shaft and a fan of the turbine engine.

BRIEF DESCRIPTION OF THE DRAWINGS

Further features and advantages of the invention will emerge on reading the following detailed description, for the comprehension whereof reference will be made to the appended figures wherein.

DETAILED DESCRIPTION OF PARTICULAR EMBODIMENTS

Figure 1:
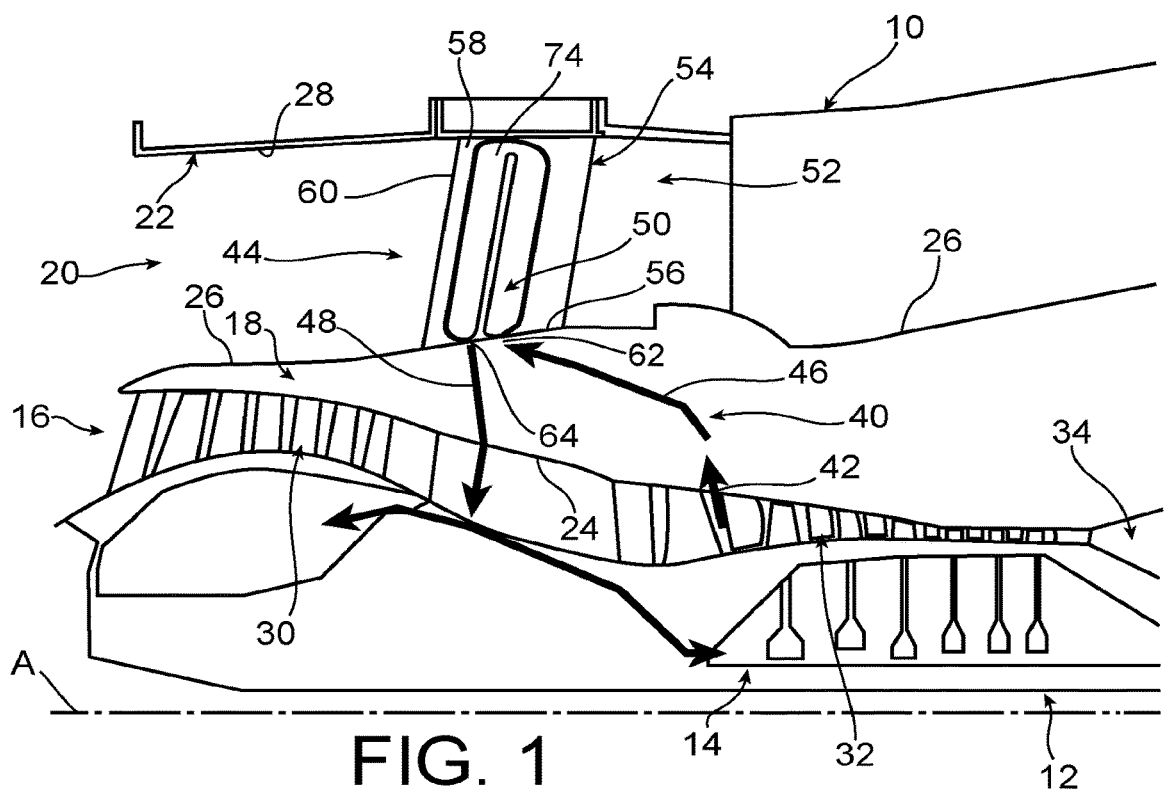
FIG. 1 is a schematic axial sectional representation of an aircraft turbine engine including a pressurized air circuit embodied according to the invention.

An aircraft turbine engine 10 is represented in FIG. 1.

The turbine engine 10 includes, moving away from the main axis A thereof, a low-pressure shaft 12, a high-pressure shaft 14, a primary air flow path 16, a secondary air flow path 20, an inter-path compartment 18 separating the primary path 16 and the secondary path 20 and an intermediate casing ferrule 22.

The inter-path compartment 18, also referred to as "core compartment", is delimited radially by a radially inner wall 24 delimiting the exterior of the primary path 16 and a radially outer wall 26 delimiting the interior of the secondary path 20. The ferrule 22 includes a radially inner wall 28 delimiting the exterior of the secondary path 20.

The primary path 16 includes, from upstream to downstream, along the direction of air flow therein, i.e., herein from left to right with reference to FIG. 1, a low-pressure compressor 30, a high-pressure compressor 32, a combustion chamber 34, a high-pressure turbine and a low-pressure turbine (not shown).

The secondary path 20 includes a straightener 52 which is intended to redirect the air stream flowing in the secondary path 20, so that the latter has an axially oriented flow.

The straightener 52 includes a plurality of vanes 54 distributed regularly about the main axis A of the turbine engine 10 which act upon the air stream circulating in the secondary path 20 to redirect the air stream in the main axis of the turbine engine 10.

Each vane 54 extends essentially radially with respect to the main axis A and includes a radially inner radial root end 56 for the connection thereof with the inter-path compartment 18 and a radially outer radial head end 58 for the connection thereof with the ferrule 22.

The turbine engine 10 further includes air circuits (not shown) which are distributed in the interior thereof to cool several components of the turbine engine.

Among these circuits, and as can be seen in FIG. 1, the turbine engine 10 includes a pressurized air circuit 40 which is designed to both cool the low-pressure shaft 12 and supply pressurized air to the enclosures containing the lubrication oil of moving parts, which are located at the level of the low-pressure shaft and which make it possible to pressurize this lubrication oil.

This pressurized air can also supply a reduction gear (not shown) which is arranged between the low-pressure shaft 12 and the fan of the turbine engine.

The reduction gear makes it possible to dissociate the rotational speed of the fan with that of the low-pressure shaft 12 whereby the fan is driven. This makes it possible particularly to reduce the rotational speed of the fan blades with respect to that of the low-pressure compressors, and thus optimize the respective efficiencies thereof and therefore enhance the propulsive efficiency. Such a reduction gear is particularly advantageous in the case of a turbojet engine with a high bypass ratio, i.e., for which the ratio between the quantity of air stream flowing in the secondary path.

A high bypass ratio makes it possible to reduce motor consumption, but results in large fan dimensions. The rotational speed of the fan is then limited, and restricts equally that of the low-pressure compressor and the low-pressure turbine.

This pressurized air circuit 40 includes at least one air extraction point 42 which is located on the radially inner wall 24 of the inter-path compartment 18. This extraction point 42 is located between the low-pressure compressor 30 and the high-pressure compressor 32 or indeed in the high-pressure compressor 32.

In the latter case, the extraction point is located at the level of one of the stages of the high-pressure compressor 32 which is determined according to the pressure of the pressurized air, the temperature thereof and the possibility of carrying out an extraction on the first stages of the high-pressure compressors 32 despite the presence of variable stator vanes (commonly referred to as VSV).

The extracted air is at a sufficiently high pressure to pressurize the oil enclosures. On the other hand, the temperature of this air is too high to allow the cooling of the low-pressure shaft 12 and also to obtain good operating conditions of the lubrication circuit.

The pressurized air circuit 40 includes for this purpose a heat exchanger 44 suitable for reducing the temperature of the pressurized air.

This heat exchanger 44 is of the air-air type and the cold air source consists of the air circulating in the secondary path 20.

The heat exchanger 44 is thus located at the level of the secondary path 20, as will be described hereinafter.

The pressurized air circuit 40 includes, in the direction of air flow therein, an upstream section 46 which extends from the air extraction point 42 to the heat exchanger 44, the heat exchanger 44, a downstream section 48 which extends from the heat exchanger 44 to the low-pressure shaft 12 and means (not shown) for distributing the pressurized air in the direction of the cooling points of the low-pressure shaft 12 and the oil pressurization enclosures.

Thus, the upstream section 46 of the pressurized air circuit 40 extends through the inter-path compartment 18, from the radially inner wall 24 thereof at the level whereof the upstream section 46 is connected to the air extraction point 42, to the radially outer wall 26 of the inter-path compartment 18, at the level whereof it is connected to the heat exchanger 44.

Also the downstream section 48 of the pressurized air circuit extends through the inter-path compartment 18, from the radially outer wall thereof at the level whereof it is connected to the heat exchanger 44 and it also traverses the primary path 16 in profiled arms 80 placed between the low-pressure 30 and high-pressure compressor 32, advantageously.

As stated above, the cold air source of the heat exchanger 44 consists of the air circulating in the secondary path 20.

To carry out the heat exchange between the pressurized air and the fresh air circulating in the secondary path 20, the heat exchanger 44 includes a duct 50 which is arranged inside at least one vane 54 of the straightener 52.

The duct 50 includes a pressurized air inlet 62 whereby the duct is connected to the upstream section 46 and a pressurized air outlet 64 whereby the duct 50 is connected to the downstream section 48.

In the following description, reference will be made to a vane 54 wherein a duct 50 is arranged. It will be understood that the invention is not limited to this embodiment and that several vanes 54 can each include a duct 50 of the heat exchanger 44.

In addition to the initial function thereof of straightening the air stream circulating in the secondary path 20, the vane 54 is designed to carry out the heat exchange function between the pressurized air stream circulating in the duct 50 and the air stream circulating in the secondary path 20.

Thus, the duct 50 is in thermal contact with an inner wall of the vane 54. The outer wall 60 of the vane is defined independently of the heat exchange function.

The constituent material of the vane 54 is chosen to favor heat exchanges. This material is for example an aluminum alloy or indeed a titanium alloy in the case where the vane 54 would be a structural element of the turbine engine. It will be understood that the invention is not limited to these materials and that the vane 54 can be produced in any other material having suitable heat dissipation properties.

The shape of the outer wall 60 of the vane 54 is identical to that of the other vanes 54 not having the heat exchange function, the heat exchanger 44 therefore has no impact on the air flow in the secondary path 20.

The duct 50 is configured to be connected to the upstream section 46 and to the downstream section 48, i.e., the pressurized air inlet 62 thereof, whereby the duct 50 is connected to the upstream section 46, and the pressurized air outlet 64, whereby the duct 50 is connected to the downstream section 48, are located at the level of the same radial end of the vane 54, which is herein the inner radial root end 56 of the vane.

The rest of the duct 50 extends inside the vane 54. According to a first embodiment, the duct 50 forms an inverted U, i.e., it includes a bend 74 located at the level of the outer radial head end 58 of the vane 54.

Alternatively, the duct includes several bends 74 distributed in the vane 54, which makes it possible to increase the length of the duct 50 in the vane 54 in order to enhance the heat exchanges.

Figure 2:
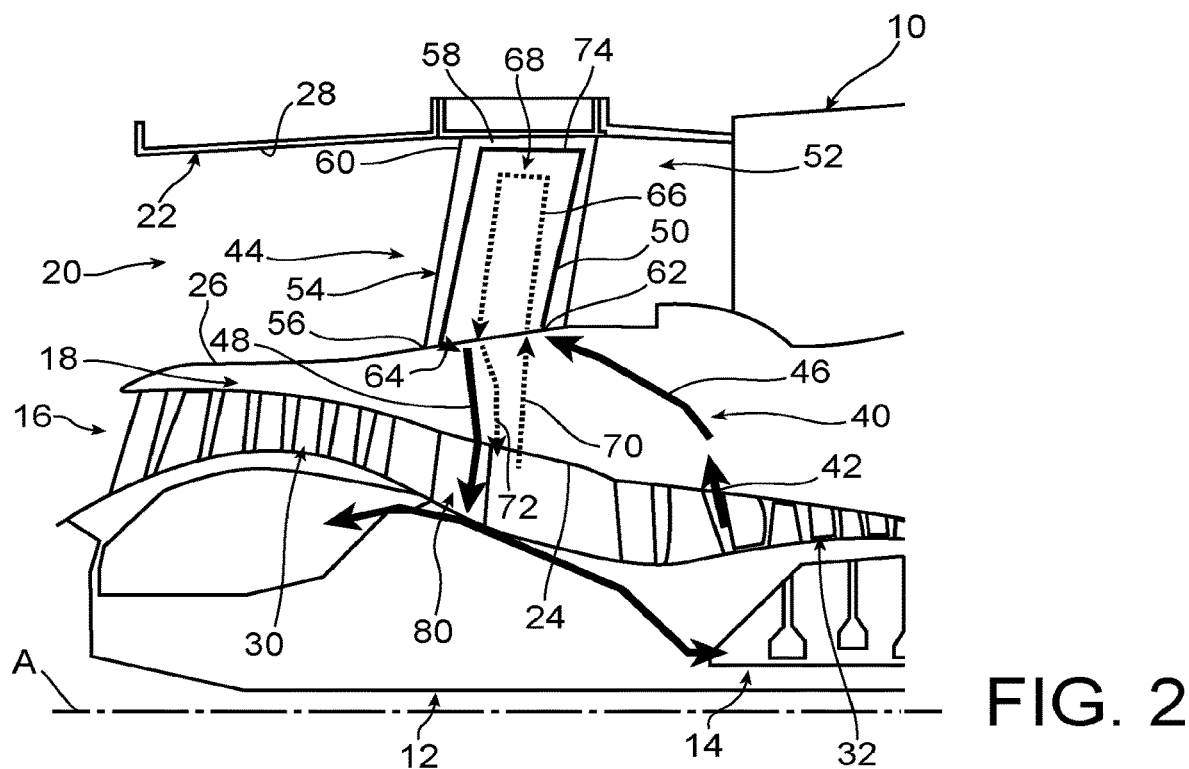
FIG. 2 is a detail on a larger scale of a section of the duct used to carry out heat exchange.

According to an alternative embodiment, as can be seen in FIG. 2, the vane 54 also receives a section 66 of a lubrication circuit 68 wherein a fluid such as a lubrication fluid, such as oil circulates.

This section 66 cooperates with the vane 54 to carry out a cooling of the lubrication fluid, similarly to the cooling of the pressurized air.

The section 66 of the lubrication circuit 68 includes a lubrication fluid inlet 70 and a lubrication fluid outlet 72, which are connected to the rest of the lubrication circuit 68.

Preferably, the lubrication fluid inlet 70 and the lubrication fluid outlet 72 are also located at the level of the inner radial root end 56 of the vane 54. Thus, only this inner radial root end 56 of the vane 54 includes means for connecting the different inlets and outlets of the duct and the section 66, which simplifies the structure thereof.

This alternative embodiment makes it possible to use as many fixed vanes as possible to form heat exchangers.

Regardless of the embodiment, the vane 54 is produced such that the outer wall 60 thereof does not include any extraction orifice of a portion of the air stream circulating in the secondary path 20. Thus, the inner volume of the vane 54 is isolated from the air stream flowing in the secondary path 20.

Also, it is produced to favor heat exchanges between the air stream circulating in the secondary path 20 and the pressurized air circulating in the duct 50, and if applicable also with the lubrication fluid.

According to a non-limiting embodiment, the vane 54 is produced by means of the so-called additive manufacturing technique. In this case, the duct 50 and the section 66, if applicable, are manufactured simultaneously.

According to a further embodiment, the vane 54 is produced by forging a plate or a bar. The vane can also be produced by machining, in which case a cavity is arranged in the vane, to form the duct 50 or the section 66 and this cavity is resealed by a bonded, welded, or brazed plate.

The invention claimed is:

1. An aircraft turbine engine including a main axis and comprising:
   a primary air flow path in which a low-pressure compressor and a high-pressure compressor are arranged,
   a secondary air flow path which is located around the primary air flow path and coaxial with the primary air flow path, including a straightener of an air stream flowing in the secondary air flow path, the straightener including a plurality of vanes distributed around the main axis of the turbine engine,
   a pressurized air circuit extracting air from between the low-pressure compressor and the high-pressure compressor or from within the high-pressure compressor to produce a pressurized air stream supplying at least one component of the turbine engine, said at least one component being located radially within the turbine engine closer to the main axis of the turbine engine than the primary air flow path,
   wherein the pressurized air circuit includes a heat exchanger between the pressurized air stream and the air stream flowing in the secondary air flow path, the pressurized air circuit being arranged in at least one of the plurality of vanes of the straightener,
   wherein the heat exchanger includes a duct arranged in said at least one of the plurality of vanes, each of said at least one of the plurality of vanes including a pressurized air inlet and a pressurized air outlet which are located at a same radial end of said at least one of the plurality of vanes, and
   wherein a lubrication circuit in which a lubrication fluid circulates, includes a section arranged in said at least one of the plurality of vanes,
   wherein the section of the lubrication circuit cooperates with the said at least one of the plurality of vanes to carry out a cooling of the lubrication fluid, and
   wherein for each of said at least one of the plurality of vanes, the duct includes a bend, the bend being radially outward of the section of the lubrication circuit with respect to the main axis.

2. The turbine engine according to claim 1, wherein for each of said at least one of the plurality of vanes, the pressurized air inlet and the pressurized air outlet of the duct are located at the same radial end at a level of an inner radial end of said at least one of the plurality of vanes.

3. The turbine engine according to claim 1, wherein an internal volume of each of said at least one of the plurality of vanes is isolated from the air stream flowing in the secondary air flow path.

4. The turbine engine according to claim 3, wherein the duct of the heat exchanger and the section of the lubrication circuit are arranged in the respective internal volume of each of said at least one of the plurality of vanes.

5. The turbine engine according to claim 3, wherein for each of said at least one of the plurality of vanes, said section includes a lubrication fluid inlet and a lubrication fluid outlet which are located at a level of the same radial end of said at least one of the plurality of vanes as the pressurized air inlet and the pressurized air outlet of the duct.

6. The turbine engine according to claim 5, wherein for each of said at least one of the plurality of vanes, the lubrication fluid inlet is upstream of the pressurized air inlet with respect to the air stream flowing in the secondary air flow path, and the lubrication fluid outlet is downstream of the pressurized air outlet with respect to the air stream flowing in the secondary air flow path.

7. The turbine engine according to claim 1, which includes an inter-path compartment located between the primary air flow path and the secondary air flow path, wherein:
- the pressurized air circuit includes, in a direction of air flow therein:
  - at least one air extraction point which is borne by a radially inner wall of the inter-path compartment;
  - an upstream section extending through the inter-path compartment to the secondary air flow path;
  - said duct disposed in said at least one of the plurality of vanes; and
  - a downstream section extending through the inter-path compartment from the secondary air flow path to the primary air flow path and extending through a profiled arm traversing the primary air flow path; and
  - the pressurized air stream is distributed from the downstream section to said at least one component of the turbine engine.

8. The turbine engine according to claim 1, wherein said at least one component of the turbine engine is a low-pressure shaft of the turbine engine.

9. The turbine engine according to claim 1, wherein said at least one component is a lubrication oil pressurization enclosure.

10. The turbine engine according to claim 1, wherein said at least one component is a reduction gear which is arranged between the low-pressure shaft and a fan of the turbine engine.

11. The turbine engine according to claim 1, wherein the lubrication fluid is oil.

* * * * *